United States Patent [19]

Huper

[11] 3,900,488

[45] Aug. 19, 1975

[54] PRODUCTION OF 6-AMINOPENICILLANIC ACID

[75] Inventor: Fritz Huper, Wuppertal, Germany

[73] Assignee: Bayer Aktiengesellschaft, Leverkusen, Germany

[22] Filed: Nov. 21, 1972

[21] Appl. No.: 308,576

[30] Foreign Application Priority Data
Nov. 23, 1971 Germany............................ 2157970

[52] U.S. Cl..... 260/306.7 C; 260/239.1; 260/243 C
[51] Int. Cl.²....................................... C07D 499/42
[58] Field of Search.................. 260/239.1, 306.7 C

[56] References Cited
UNITED STATES PATENTS 3,079,305  2/1963  Kaufmann....................... 260/239.1
3,180,861  4/1965  Sakaguchi et al................ 260/239.1
3,574,225  4/1971  Munden........................... 260/239.1

Primary Examiner—Nicholas S. Rizzo
Attorney, Agent, or Firm—DePaoli & O'Brien

[57] ABSTRACT

An extremely important major industrial advance in the field of manufacture of 6-aminopenicillanic acid is disclosed which involves contacting a penicillin and a water-insoluble polymeric carrier-bound penicillin acylase with the concommitant production of 6-aminopenicillanic acid.

12 Claims, No Drawings

PRODUCTION OF 6-AMINOPENICILLANIC ACID

BACKGROUND OF THE INVENTION

The ability of penicillin acylase, also known in the art as penicillin amidase or penicillin deacylase (Enzyme Commission No. 3.5.1.11) to hydrolytically cleave the amido bond in the 6-position of benzyl penicillin has been and is now being exploited world wide on a large industrial scale in a process for the manufacture of 6-aminopenicillanic acid in the field of semi-synthetic penicillins of improved medical properties. For example, acylation of 6-aminopenicillanic acid, the "penicillin nucleus," has produced semi-synthetic penicillins of demonstrated effectiveness against the troublesome penicillinase-producing clinically resistant staphylococcal infections.

Generally, the presently employed industrial process is carried out by using whole cells containing the penicillin acylase enzyme as illustrated by German Pat. No. 1,111,778. In such process a bacterial sludge, preferably of *E. coli*, is employed and, while the process is widely used commercially, it does suffer serious disadvantages including:

a. the bacterial sludge contains other proteins and enzymes in addition to penicillin acylase as impurities which cannot be completely eluted from crystalline 6-aminopenicillanic acid during the purification process;

b. the bacterial sludge can only be employed once during the commercial process;

c. the bacterial sludge contains impurities and other undesirable enzymes which inactivate benzyl penicillin and/or 6-aminopenicillanic acid by opening the β-lactam ring;

d. the bacterial sludge per se contains but small amounts of the enzyme penicillin acylase thus limiting the possibility of improving the yields of the 6-aminopenicillanic acid with a concomitant lower content of decomposition products by the use of more of the enzyme material and shorter reaction times;

e. the yields of 6-aminopenicillanic acid are dependent of the varying amounts of penicillin acylase formed in the particular fermentation batches;

f. the complete removal of the bacterial cells requires an additional process step when working-up batches of 6-aminopenicillanic acid resulting in loss of yield of desired product. Additionally, further purification steps are necessary to remove impurities which can cause allergic reactions (British patent specification Nos. 1,169,696, 1,078,847, 1,114,311, and German Offenlegungsschrift No. 1,909,915).

Accordingly, a primary object of the invention resides in the provision of a carrier-bound penicillin acylase which can be employed with facility in the production of 6-aminopenicillanic acid of a greater degree of purity.

Another object of the invention resides in the provision of an improved process for the production of 6-aminopenicillanic acid by means of penicillin acylase enzyme covalently bonded to an insoluble carrier comprising an interpolymer of acrylamide, N,N'-methylene-bis-acrylamide and maleic acid.

Still another object of the invention resides in the provision of an improved process for the production of 6-aminopenicillanic acid by means of the enzyme penicillin acylase covalently bound to an insoluble carrier which is an interpolymer of acrylamide, N,N'-methylene-bis-acrylamide and maleic acid, in the anhydride form.

The production of enzymatically active modified enzymes covalently bonded through groups of the enzyme which are non-essential to their enzymatic activity either directly or through polymeric chains to water-insoluble carriers was first described in U.S. Pat. No. 3,167,485. Also, previous attempts to bind penicillin acylase to a polymeric carrier by covalent bonding and to use the same for the production of 6-aminopenicillanic acid have been described in German Offenlegungsschrift Nos. 1,917,057, 1,907,365, and 1,933,301. These methods, however, proved highly unsatisfactory since, under the conditions of coupling, the enzyme either loses a greater part of its original biological activity or yields less than 50 percent of enzyme bound to the carrier are produced, thus making the same unsuitable for its intended use.

Thus, it is apparent that, for the production of water-insoluble penicillin acylase enzyme derivatives in high yields and of sufficient biological activity for use as heterogeneous specific catalysts to induce specific chemical changes on an industrial scale, a great many problems are encountered for the successful production thereof. As pointed out above, for example, with respect to German Offenlegungsschrift Nos. 1,917,057, 1,907,365, and 1,933,301, the methods of covalent linkage and choice of carrier illustrate but two of the problems generally encountered. While yields of 50 to 60 percent of carrier bound penicillin acylase can be obtained, as illustrated in German Offenlegungsschrift No. 1,917,057, when a linear copolymer of ethylene and maleic anhydride is employed, the resultant resin of the enzyme carrier product is so highly cross-linked by higher protein concentrations that it is only partially accessible to substrate penicillins when used in the manufacture of 6-aminopenicillanic acids.

The polymeric carrier, however, is quite heterogenous and, upon subsequent hydrolysis of the carboxylic acid anhydride groups, it becomes water-soluble at neutral or alkaline pH values. A degree of water-insolubility can be partially restored through binding to the enzyme or cross-linking with diamines or polyamines. Furthermore, at higher enzyme concentrations, the insoluble penicillin acylase enzyme-polymeric carrier is so highly cross-linked that the soluble substrate benzyl penicillin does not have ready access thereto for satisfactory production of 6-aminopenicillanic acid.

Thus, it is obvious that the various physical attributes of the carrier discussed above, degree of cross-linking and solubility, as well as others, such as, for example, mechanical stability, swelling characteristics, electric charge and degrees of hydrophilicity and/or hydrophobicity play a major role in determining the maximal amount of enzyme which can be covalently bound and the stability and biological activity of the resultant penicillin acylase conjugate if it is to be suitable for use in the production of 6-aminopenicillanic acid from a soluble penicillin substrate.

Accordingly, it is yet another object of the invention to provide an improved process for the manufacture of 6-aminopenicillanic acid in extremely high yield and substantially free of proteinaceous impurities employing penicillin acylase covalently bonded to an interpolymeric carrier containing a loosely cross-linked polymer network thereby enabling ready access and contact of soluble substrate penicillins and corresponding conversion thereof to the desired 6-aminopenicillanic acid in high yields and purity.

THE INVENTION

The present invention relates to, in general, a process for the production of 6-aminopenicillanic acid and, in particular, relates to a novel process for the production of 6-aminopenicillanic acid which comprises contacting a penicillin in an aqueous solution and an insoluble polymeric carrier-penicillin acylase product wherein the penicillin acylase is covalently bonded thereto and said carrier comprises an interpolymer of acrylamide, N,N'-methylene-bis-acrylamide and maleic acid.

The interpolymer of acrylamide, N,N'-methylene-bis-acrylamide and maleic acid in the anhydride form employed in producing the novel water-insoluble penicillin acylase conjugates for the production of 6-aminopenicillanic acid is an interpolymer of components of from about:

a. 50 to 90 percent, and preferably 60 to 80 percent, by weight, of acrylamide; and
b. 2.5 to 25 percent, and preferably 4 to 20 percent, by weight, of N,N'-methylene-bis-acrylamide; and
c. 5.0 to 30 percent, and preferably 10 to 20 percent, by weight, of maleic acid in the anhydride form, the total amount of said components being 100 percent by weight.

The use of interpolymers, of the type described above, provides a carrier containing a loosely cross-linked polymer network and which are capable of swelling which permits ready access of the soluble substrate penicillins to the penicillin acylase and gently binds the same within the polymer network, thus preserving and retaining the enzymatic activity after binding of the penicillin acylase to the insoluble polymer carrier network.

As a result of use of the water-insoluble interpolymeric carriers of the class described for covalently bonding penicillin acylase thereto up to 98 percent of the penicillin acylase can be bound by covalent bonding to the water-insoluble interpolymeric carrier depending upon the type of interpolymer employed.

In employing the N,N'-methylene-bis-acrylamide in the preparation of the interpolymeric carrier, care must be exercised to employ an amount thereof to provide sufficient cross-linking so that a portion of the resulting enzyme resin conjugate is not water-soluble. Likewise, the employment of amounts in excess of those specified above produces a gel-like cross-linked resin structure which is too highly cross-linked to permit obtainment of the maximal amount of penicillin acylase which can be covalently bound thereto thus affecting the ultimate stability and biological activity of the insoluble product.

When the monomeric reactants mentioned above are polymerized in amounts in the ranges specified above, interpolymers containing N,N'-methylene-bis-acrylamide units characterized by the formula:

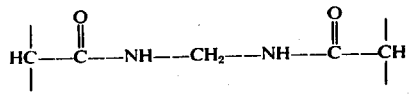

acrylamide units characterized by the formula:

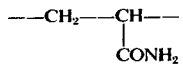

maleic acid units characterized by the formula:

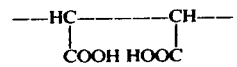

The water-insoluble interpolymeric carrier obtained upon completion of the polymerization reaction is in gel-like form and is mechanically treated by forcing through a sieve of 0.5 mm. mesh width. The product obtained is well washed and dried under a vacuum.

The interpolymer obtained by reacting the aforementioned reactants is a gel-like resinous material containing pendant carboxyl groups. These carboxyl groups are converted to the anhydride form by heating, preferably to 180°C. for up to about 2 hours. Care should be exercised by not heating to 180°C. for much longer than 2 hours since it has been observed that it distinctly affects the binding capacity of the resultant water-insoluble interpolymeric carrier.

As may be observed from the foregoing, the protein-binding capacity of the water-insoluble interpolymeric carrier is related to the number of anhydride groups present and upon pore size. In general, the binding capacity of a more highly cross-linked product is less than that of a loosely cross-linked product. However, as a result of a lesser degree of cross-linking, the ability of the carrier to swell increases.

The coupling reaction employed in producing the novel insoluble penicillin acylase-polymer products of the invention comprises contacting an aqueous solution containing penicillin acylase and an interpolymer of acrylamide, N,N'-methylene-bis-acrylamide and maleic acid in the anhydride form while controlling and maintaining the pH of the reaction mixture at a value in the range of from 5.0 to 6.5 and at a temperature below about 20°C.

The reaction conditions employed in the coupling reaction are not necessarily critical features of the invention in the obtainment of penicillin acylase covalently bonded to a carrier of the class described. However, to obtain water-insoluble penicillin acylase-polymer products in high yield of carrier-bound penicillin acylase and possessing high enzymatic activity, the reaction conditions employed are of importance. Inasmuch as the amino groups of the penicillin acylase enzyme react with the anhydride groups of the polymeric carrier, a weakly acidic cation exchanger is produced by solvolysis of the anhydride groups. This causes the pH of the reaction mixture to slowly decrease unless dilute alkali solution is added to the reaction mixture. It is, therefore, preferable to control and maintain the pH of the reaction mixture at a value in the range of from 5.0 to 6.5. This may be conveniently accomplished by the addition of dilute aqueous alkali solution, such as aqueous sodium hydroxide or aqueous potassium hydroxide. A pH-stat may be employed if desired.

The pH value of the reaction mixture is also of importance with respect to the yield of polymeric carrier-bound penicillin acylase. Thus, for example, the yield of carrier-bound enzyme is 98.0 percent at pH 5.8;

45.0 percent at pH 6.5; and 22.0 percent at pH 4.5. Accordingly, a pH of 5.8 is preferred.

The temperature of the coupling reaction likewise exerts an effect on the product produced. At higher temperatures, hydrolysis of the cyclic anhydride groups of the carrier takes place more rapidly than ammonolysis reaction of the penicillin acylase amino group with the cyclic anhydride groups of the polymeric carrier. It is, therefore, preferred to carry out the coupling reaction at a temperature of about 4°C.

The ionic strength of the coupling reaction mixture also exerts an effect on the resultant product and is, preferably, carried out in a buffer solution of low ionic strength. At high buffer concentrations, the polymeric carrier shrings somewhat, thus causing the penicillin acylase enzyme to penetrate the carrier matrix more slowly. This condition is alleviated by employing a buffer solution of low ionic strength. Preferably, 0.01 to 0.05 M phosphate buffer is employed.

When the coupling reaction is complete, the carrier-bound penicillin acylase is recovered as by filtration and thoroughly washed with water and with 1 M sodium chloride solution.

A typical coupling reaction of the enzyme penicillin acylase and a polymeric carrier comprises adding about 3 to 4 grams of carrier to an aqueous solution of penicillin acylase in 250 milliliters of 0.01 M phosphate buffer at a pH of 5.8. The mixture is thoroughly stirred and, after about 2 hours, additional carried is added to the reaction mixture in small increments. During the entire reaction, the pH value is controlled and maintained at the selected pH by the addition of dilute aqueous sodium hydroxide solution. If, after about 5 hours reaction time, testing of the aqueous supernatant liquid indicates the presence of unreacted penicillin acylase, further additions of carrier are undertaken until the reaction is complete.

In carrying out the coupling reaction, it has been found that it is preferable to employ at least 10 grams of carrier per gram of penicillin acylase employed. To insure completeness of the coupling reaction, a ratio of one part of penicillin acylase to 15 to 20 parts of carrier are generally adequate.

The water-insoluble carrier-bound penicillin acylase obtained can be stored without loss of enzymatic activity and subsequently can be employed in the manufacture of 6-aminopenicillanic acid.

To determine the enzymatic activity of the carrier-bound penicillin acylase, a solution containing 30,000 IU/ml of potassium penicillin G is incubated at a temperature of 37°C. The phenylacetic acid liberated is titrated with N/10 sodium hydroxide solution while maintaining the pH value constant at 7.8. One enzyme-unit (U) is the activity which, under these conditions, splits 1μ mol of penicillin G per minute to yield 6-aminopenicillanic acid and phenylacetic acid and simultaneously consumes 1μ mol of sodium hydroxide solution.

The splitting reaction, in accordance with the invention, of water-soluble substrate penicillins can be carried out in a simple and efficacious manner on a commercial scale. For example, the water-insoluble polymeric carrier-bound penicillin acylase can be suspended in an aqueous solution containing the water-soluble substrate penicillin at appropriate temperature and pH values for a period of time sufficient to cause hydrolytic cleavage of the amido bond of the substrate penicillin with the corresponding production of 6-aminopenicillanic acid.

Penicillins finding immediate and practical utility in the process of the invention include the natural and synthetic penicillins and salts thereof, both chemically and biochemically produced and which can be conveniently characterized by the structural formula:

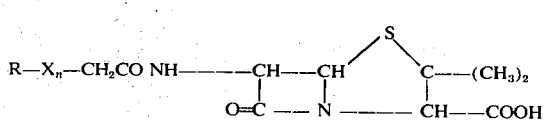

wherein $n$ is a whole figure selected from the group consisting of 0 and 1, $X$ is a member selected from the group consisting of sulphur and oxygen, R is a member selected from the group consisting of alkyl groups having 2 through 6 carbon atoms, alkenyl groups having 3 through 6 carbon atoms, phenyl and monosubstituted phenyl groups in which the substituent is a member selected from the group consisting of chloro, bromo, iodo, fluoro, nitro, alkyl groups having from 1 to 6 carbon atoms inclusive, alkenyl groups having from 3 to 6 carbon atoms inclusive, and alkoxy in which the alkyl group has from 1 to 6 carbon atoms inclusive.

The term "alkyl" as used herein means both branched and straight chain saturated aliphatic hydrocarbon groups such as, for example, ethyl, n-propyl, isopropyl, n-butyl, isobutyl, n-amyl, isoamyl, etc., and both the branched and straight chain saturated aliphatic radicals may have a halogen substituent such as 2-chloroethyl, etc. The term "alkenyl" as used herein means both branched and straight chain unsaturated aliphatic hydrocarbon radicals having from 3 to 6 carbon atoms inclusive such as, for example, allyl, 2-methyl allyl, butene-2-yl, and the monosubstituted branched and straight chain unsaturated aliphatic radicals wherein the monosubstituent is chloro, fluoro, iodo or bromo such as 2-bromoallyl, 3-chloroallyl, and the like.

The penicillins depicted above, which are used as substrates in the process of the present invention, include those penicillins produced by a fermentation process using a precursor as described in U.S. Pat. Nos. 2,562,410, 2,479,295, 2,479,296, and 2,854,450 relating to the preparation of many biosynthetic penicillins. Such penicillins include, for example, phenoxymethyl penicillin (penicillin V) and monosubstituted phenoxymethyl penicillins such as p-methoxyphenoxymethyl penicillin, p-nitrophenoxymethyl penicillin, hydroxyphenoxymethyl penicillin, p-chlorophenoxymethyl penicillin, p- and m-toloxyphenoxymethyl penicillin, etc.; alkoxymethyl penicillins, such as, for example, ethoxymethyl penicillin, n-butoxymethyl penicillin, isoamyloxymethyl penicillin, hexyloxymethyl penicillin; alkenyloxymethyl penicillins such as allyloxymethyl penicillin, 2-methylallyoxymethyl penicillin, etc.; and the sulfur-containing penicillins such as p-tolythiomethyl penicillin, β-naphthylthiomethyl penicillin, ethylthiomethyl penicillin, n-butylthiomethyl penicillin, allylthiomethyl penicillin, etc. Each of the penicillins of the above formula can be used in the form of their salts with a cation which will not interfere with the enzymatic hydrolysis; the most common of which are the alkali metal and alkaline earth metal salts such as the sodium, calcium and potassium salts.

The concentration of the penicillins employed in the process of the invention is not necessarily a critical feature of the invention and practically any suitable concentration of penicillin will suffice depending on such factors as the reaction time desired, pH of the reaction medium, the activity of the water insoluble polymeric carrier bound penicillin acylase employed temperatures and the like. Preferably, a concentration in the reaction medium of from about 75,000 to 150,000 IU/ml. of penicillin such as, for example, benzyl penicillin (penicillin G) is employed.

Likewise, the pH of the reaction medium is not necessarily a critical feature of the invention but care should be exercised in maintaining the pH value of the reaction medium favoring the production of 6-aminopenicillanic acid. For this reason, a pH value in the range of from about 6.0 through about 8.0, and preferably 7.0 through 7.8, is desirable since at pH values much above 8.0 the water-soluble substrate penicillin and/or the 6-aminopenicillanic acid can be inactivated by the opening or rupture of the beta-lactam ring whereas, at pH values much below about 6.0, the equilibrium is displaced in favor of the starting water-soluble substrate penicillin. A constant pH value in the aforementioned range is preferred with a pH value of 7.8 being particularly preferred.

The temperature at which the reaction is carried out is also not necessarily critical and any suitable operating temperature in the range of from about 20°C. to about 50°C. with a temperature of about 38°C. being preferred.

Aqueous alkali solution may be used, if desired, to neutralize the carboxylic acid produced during the enzymatic splitting reaction. In the case where benzyl penicillin (penicillin G) is employed as the water-soluble substrate penicillin, it is advantageous to employ a potassium or sodium hydroxide solution to neutralize the phenylacetic acid produced. Organic amines, such as and preferably, triethylamine, can also be employed to neutralize the phenylacetic acid produced during the reaction. When triethylamine is employed, it has been observed that the activity of the water-insoluble polymeric carrier-bound penicillin acylase remains unimpaired even after repeated use.

The reaction time is dependent upon the amount of water-insoluble polymeric carrier-bound enzyme employed. Thus, for example, complete hydrolysis has been attained in a splitting batch having a concentration of 100,000 IU/ml. of potassium benzyl penicillin (penicillin G) to 6-aminopenicillanic acid and phenylacetic acid after 12 hours at pH 7.8 and a temperature of 38°C., using $10^5$ IU of benzyl penicillin (penicillin G) per unit of penicillin acylase. As used herein, one enzyme unit (U) is defined as the enzymic activity which hydrolyzes 1 $\mu$ mol of penicillin G per minute to 6-aminopenicillanic acid and phenylacetic acid at 37°C. Thus, if $5 \times 10^4$ IU of benzyl penicillin (penicillin G) are employed per unit of penicillin acylase, the time for complete hydrolysis is 6 hours. Shorter reaction times are also possible if a higher amount of enzyme is employed. Correspondingly, the time period required for hydrolysis is longer if less enzyme is employed. However, because of the inactivation of the water-soluble penicillin substrate and/or 6-aminopenicillanic acid, the hydrolysis reaction times of more than 20 hours lead to losses in yield of desired 6-aminopenicillanic acid.

The enzymatic hydrolysis or splitting according to the invention is preferably carried out at a temperature of about 38°C. since at lower temperatures the activity of the enzyme declines. If, for example, the hydrolytic splitting is carried out at a temperature of 25°C., twice as much enzyme has to be employed as at 38°C. if the same reaction times are to be achieved.

The activity of the water-insoluble polymeric carrier-bound penicillin acylase decreases distinctly in solutions of higher water-soluble penicillin concentrations. Thus, hydrolytic splitting of a solution containing 75,000 IU/ml of benzyl penicillin (penicillin G) requires 12 hours while, with 150,000 IU/ml, it requires 15 hours if only the concentration, but not the ratio of enzyme to benzyl penicillin (penicillin G) is changed. Preferably, water-soluble penicillin substrate solutions containing 75,000 to 100,000 IU/ml of a penicillin such as benzyl penicillin (penicillin G) are employed.

The 6-aminopenicillanic acid can be isolated by simple methods when the water-insoluble polymeric carrier-bound enzyme preparation is employed. The carrier-bound penicillin acylase can be removed by centrifuging or filtration after the hydrolytic splitting reaction and can be repeatedly employed for further splitting batches.

The 6-aminopenicillanic acid formed during enzymatic hydrolysis of splitting according to the invention can be obtained in a crystalline form from the reaction solution, after separation from the insoluble enzyme and concentration in vacuo, by precipitation at the isoelectric point at pH 4.3.

By splitting benzyl penicillin (penicillin G) according to the invention with the water-insoluble polymeric carrier-bound enzyme preparation, substantially higher yields of 6-aminopenicillanic acid are obtained than when using *E. coli* sludge. Thus, it has been demonstrated that 6-aminopenicillanic acid isolated in an average yield of 87 percent theory if the water-insoluble polymeric carrier-bound penicillin acylase is repeatedly recycled. The purity of the preparations averaged 97 percent. 6-aminopenicillanic acid produced in accordance with the invention does not contain any protein as an impurity. Also, allergic side-effects on administration to patients which are attributable to proteins are impossible with penicillins produced from the 6-aminopenicillanic acid according to the invention.

The following examples will serve to illustrate the practice of the manufacture of the polymeric carrier, the covalent bonding thereto of penicillin acylase and the use of the water-insoluble polymeric carrier bound penicillin acylase in the production of 6-aminopenicillanic acid.

EXAMPLE 1

Production of the Polymeric Carrier 450 g. of acrylamide, 22.5 g. of N,N'-methylene-bis-acrylamide and 150 g. of maleic acid are dissolved in 3,500 ml. of 0.05 M phosphate buffer, pH 7.6, and 150 ml. of 5 percent strength aqueous propionic acid nitrile solution and 150 ml. of 5 percent strength ammonium peroxydisulphate solution are added under nitrogen as protective gas. The reaction mixture is warmed to 80°C., then kept at room temperature for 15 hours and forced through a sieve of mesh width 0.5 mm. After careful washing with water, a copolymer is freeze-dried and heated for 2 hours to 180°C. under 20 mm. Hg. to convert it to the anhydride form.

EXAMPLE 2

Production of Carrier-bound Penicillin Acylase 1.0 g. of penicillin acylase of specific enzymatic activity 15 U/mg. is dissolved in 200 ml. of M buffer of pH 5.8 and small portions of a total of 15 g. of copolymeric carrier produced according to example 1 are added over the course of 5 hours at 4°C., while stirring. The pH value is kept constant at 5.8 by means of dilute NaOH. After 24 hours at 4°C., the product is filtered off and rinsed with 300 ml. of water. The moist carrier-bound enzyme (300 g. when swollen) has a specific activity of 0.049 U/mg. Yield of penicillin acylase covalently bonded to the carrier is 98 percent.

EXAMPLE 3

Production of the Polymeric Carrier 450 g. of acrylamide, 30.0 g. of N,N'-methylene-bis-acrylamide and 150 g. of maleic acid are dissolved in 3,500 ml. of 0.05 M phosphate buffer, pH 7.6, and 150 ml. of 5 percent strength aqueous propionic acid nitrile solution and 150 ml. of 5 percent strength ammonium peroxydisulphate solution are added under nitrogen as protective gas. The reaction mixture is warmed to 80°C., then kept at room temperature for 15 hours and forced through a sieve of mesh width 0.5 mm. After careful washing with water, the copolymer is freeze-dried and heated for 2 hours to 180°C. under 20 mm. Hg. to convert it to the anhydride form.

EXAMPLE 4

Production of Carrier-bound Penicillin Acylase 1.0 g. of penicillin acylase of specific enzymatic activity 15 U/mg. is dissolved in 200 ml. of 0.01 M. buffer of pH 5.8 and small portions of a total of 15 g. of copolymeric carrier produced according to example 3 are added over the course of 5 hours at 4°C., while stirring. The pH value is kept constant at 5.8 by means of dilute NaOH. After 24 hours at 4°C., the product is filtered off and rinsed with 300 ml. of water. The yield of moist carrier-bound enzyme is 290 g. having a specific activity of 0.044 U/mg. Yield of penicillin acylase covalently bonded to the carrier is 85 percent.

EXAMPLE 5

Production of the Polymeric Carrier 450 g. of acrylamide, 45.0 g. of N,N'-methylene-bis-acrylamide and 150 g. of maleic acid are dissolved in 3,500 ml. of 0.05 M phosphate buffer, pH 7.6, and 150 ml. of 5 percent strength aqueous propionic acid nitrile solution and 150 ml. of 5 percent strength ammonium peroxydisulphate solution are added under nitrogen as protective gas. The reaction mixture is warmed to 80°C., then kept at room temperature for 15 hours and forced through a sieve of mesh width 0.5 mm. After careful washing with water, the copolymer is freeze-dried and heated for 2 hours to 180°C. under 20 mm. Hg. to convert it to the anhydride form.

EXAMPLE 6

Production of Carrier-bound Penicillin Acylase 1.0 g. of penicillin acylase of specific enzymatic activity 15 U/mg. is dissolved in 200 ml. of 0.01 M buffer of pH 5.8 and small portions of a total of 15 g. of copolymeric carrier produced according to example 5 are added over the course of 5 hours at 4°C., while stirring. The pH value is kept constant at 5.8 by means of dilute NaOH. After 24 hours at 4°C., the product is filtered off and rinsed with 300 ml. of water. The yield of moist carrier-bound enzyme is 295 g. having a specific activity of 0.039 U/mg. Yield of penicillin acylase covalently bonded to the carrier is 77 percent.

EXAMPLE 7

Production of the Polymeric Carrier 450 g. of acrylamide, 45.0 g. of N,N'-methylene-bis-acrylamide and 75.0 g. of maleic acid are dissolved in 3,500 ml. of 0.05 M phosphate buffer, pH 7.6, and 150 ml. of 5 percent strength aqueous propionic acid nitrile solution and 150 ml. of 5 percent strength ammonium peroxydisulphate solution are added under nitrogen as protective gas. The reaction mixture is warmed to 80°C., then kept at room temperature for 15 hours and forced through a sieve of mesh width 0.5 mm. After careful washing with water, the copolymer is freeze-dried and heated for 2 hours to 180°C. under 20 mm. Hg. to convert it to the anhydride form.

EXAMPLE 8

Production of Carrier-bound Penicillin Acylase 1.0 g. of penicillin acylase of specific enzymatic activity 15 U/mg. is dissolved in 200 ml. of 0.01 M. buffer of pH 5.8 and small portions of a total of 15 g. of copolymeric carrier produced according to example 7 are added over the course of 5 hours at 4°C., while stirring. The pH value is kept constant at 5.8 means of dilute NaOH. After 24 hours at 4°C., the product is filtered off and rinsed with 300 ml. of water. The yield of moist carrier-bound enzyme is 280 g. having a specific activity of 0.041 U/mg. Yield of penicillin acylase covalently bonded to the carrier is 77 percent.

EXAMPLE 9

Production of the Polymeric Carrier 450 g. of acrylamide, 135.0 g. of N,N'-methylene-bis-acrylamide and 150 g. of maleic acid are dissolved in 3,500 ml. of 0.05 M phosphate buffer, pH 7.6, and 150 ml. of 5 percent strength aqueous propionic acid nitrile solution and 150 ml. of 5 percent strength ammonium peroxydisulphate solution are added under nitrogen as protective gas. The reaction mixture is warmed to 80°C., then kept at room temperature for 15 hours and forced through a sieve of mesh width 0.5 mm. After careful washing with water, the copolymer is freeze-dried and heated for 2 hours to 180°C. under 20 mm. Hg. to convert it to the anhydride form.

EXAMPLE 10

Production of Carrier-bound Penicillin Acylase 1.0 g. of penicillin acylase of specific enzymatic activity 15 U/mg. is dissolved in 200 ml. of 0.01 M buffer of pH 5.8 and small portions of a total of 15 g. of copolymeric carrier produced according to example 9 are added over the course of 5 hours at 4°C., while stirring. The pH value is kept constant at 5.8 by means of dilute NaOH. After 24 hours at 4°C., the product is filtered off and rinsed with 300 ml. of water. The yield of moist carrier-bound enzyme is 65 g. having a specific activity of 0.146 U/mg. Yield of penicillin acylase covalently bonded to the carrier is 63 percent.

EXAMPLE 11

Production of 6-Aminopenicillanic Acid (6-APA)

57 g of moist, carrier-bound penicillin acylase (specific activity 0.044 U/mg) and 160 g. of potassium penicillin G are successively added to 2,500 ml. of water and stirred at 38°C. The pH of the mixture is kept constant at pH 7.8 by adding triethylamine. After 12 hours, no further triethylamine is taken up. The carrier-bound enzyme is filtered off, rinsed with 100 ml. of water and 100 ml. of 0.2 M sodium chloride solution and again employed for further splitting batches. The filtrate, including the wash water, is concentrated to 300 ml. in vacuo and the 6-aminopenicillanic acid is precipitated at its iso-electric point at pH 4.3 in the presence of 500 ml. of methyl isobutyl ketone. After 3 hours at 5°C., the product is filtered off and rinsed with 200 ml. of water and with 200 ml. of acetone. It is dried in vacuo at 40°C.

Melting point 208°C.; yield 88.3 percent of theory.

The same sample of carrier-bound penicillin acylase was successively employed ten times, as described above, for the enzymatic splitting of penicillin G. The yields achieved are set forth below:

| Enzymatic Splitting Reaction Number | Yield (% of Theory) |
| --- | --- |
| 2 | 87.8 |
| 3 | 86.3 |
| 4 | 88.2 |
| 5 | 87.5 |
| 6 | 86.9 |
| 7 | 88.1 |
| 8 | 87.5 |
| 9 | 85.0 |
| 10 | 86.5 |
| Average | 87.2% |

EXAMPLE 12

110 g. of moist, carrier-bound penicillin acylase (specific activity 0.044 U/mg) are stirred with 160 g. of potassium penicillin G in 2,500 ml. of water for 6 hours at 38°C. and pH 7.8, as described in example 11. The yield of 6-aminopenicillanic acid is 89.5 percent of theory.

EXAMPLE 13

30 g. of moist, carrier-bound penicillin acylase (specific activity 0.044 U/mg.) are stirred with 160 g. of potassium penicillin G in 2,500 ml. of water for 20 hours at 38°C. and pH 7.8, as described in example 1. The yield of 6-aminopenicillanic acid is 86.1 percent of theory.

EXAMPLE 14

In a manner similar to examples 12 and 13, above, the water-insoluble polymeric carrier-bound penicillin acylase of example 2, above, is reacted with the water-soluble substrate penicillin, potassium penicillin G, under hydrolytic splitting conditions to provide 6-aminopenicillanic acid in comparable yield.

EXAMPLE 15

In a manner similar to examples 12 and 13, above, the water-insoluble polymeric carrier-bound penicillin acylase of example 6, above, is reacted with the water-soluble substrate penicillin, potassium penicillin G, under hydrolytic splitting conditions to provide 6-aminopenicillanic acid in comparable yield.

EXAMPLE 16

In a manner similar to examples 12 and 13, above, the water-insoluble polymeric carrier-bound penicillin acylase of example 8, above, is reacted with the water-soluble substrate penicillin, potassium penicillin G, under hydrolytic splitting conditions to provide 6-aminopenicillanic acid in comparable yield.

EXAMPLE 17

In a manner similar to examples 12 and 13, above, the water-insoluble polymeric carrier-bound penicillan acylase of example 10, above, is reacted with the water-soluble substrate penicillin, potassium penicillin G, under hydrolytic splitting conditions to provide 6-aminopenicillanic acid in comparable yield.

While the invention has been described by the foregoing specification and specifically illustrated in the examples, it is manifest that numerous modifications and ramifications can be made with respect to the invention without departing from the spirit and scope of the invention, and it is, therefore, intended that such are contemplated and intended to be within the scope of the invention.

What is claimed is:

1. A process for the production of 6-aminopenicillanic acid which comprises contacting, in an aqueous medium, a penicillin and a water-insoluble polymer-enzyme derivative comprising penicillin acylase covalently bound to a carrier, wherein said penicillin is characterized by the structural formula:

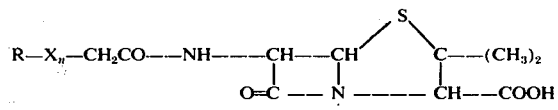

wherein $n$ is a whole figure selected from the group consisting of 0 and 1, X is a member selected from the group consisting of sulphur and oxygen, R is a member selected from the group consisting of alkyl groups having 2 through 6 carbon atoms, alkenyl groups having 3 through 6 carbon atoms, phenyl and monosubstituted phenyl groups in which the substituent is a member selected from the group consisting of chloro, bromo, iodo, fluoro, nitro, alkyl groups having from 1 to 6 carbon atoms inclusive, alkenyl groups having from 3 to 6 carbon atoms inclusive, and alkoxy in which the alkyl group has from 1 to 6 carbon atoms inclusive; wherein said carrier is an interpolymer composed of components containing from about 50 to 90 percent by weight of acrylamide, from about 2.5 to 25 percent by weight of N,N'-methylene-bis-acrylamide, and from about 5.0 to 30 percent by weight of maleic acid in the anhydride form, the total amount of said components being 100 percent by weight; and wherein the pH of the reaction medium is controlled and maintained in the range of from about 6.0 through about 8.0, and the temperature of the reaction medium is maintained in the range from about 20°C. to about 50°C.

2. The process of claim 1 wherein said penicillin is benzylpenicillin.

3. The process of claim 1 wherein said penicillin is phenoxymethyl penicillin.

4. The process of claim 1 wherein said penicillin is p-methoxyphenoxy-methyl penicillin.

5. The process of claim 1 wherein said penicillin is ethoxymethyl-penicillin.

6. The process of claim 1 wherein said penicillin is allyloxymethyl penicillin.

7. The process of claim 1 wherein said interpolymer is composed of components containing from about 4 to 20 percent, by weight, of N,N'-methylene-bis-acrylamide, 60 to 80 percent, by weight, of acrylamide, and from about 10 to 20 percent, by weight, of maleic acid, in the anhydride form, the total amount of said components being 100 percent, by weight.

8. The process of claim 1 wherein the concentration of penicillin in the reaction medium is from about 75,000 to 150,000 IU/ml of penicillin.

9. The process of claim 1 wherein the pH of the reaction medium is controlled and maintained in the range of from about 6.0 through about 8.0 by the addition to the reaction medium of a member of the group consisting of an aqueous alkali solution or an organic amine.

10. The process of claim 9 wherein the aqueous alkali solution is a sodium hydroxide solution.

11. The process of claim 9 wherein the aqueous alkali solution is a potassium hydroxide solution.

12. The process of claim 9 wherein the organic amine is triethylamine.

* * * * *

UNITED STATES PATENT OFFICE
CERTIFICATE OF CORRECTION

Patent No. 3,900,488      Dated August 19, 1975

Inventor(s) Fritz Huper

It is certified that error appears in the above-identified patent and that said Letters Patent are hereby corrected as shown below:

Column 1, line 19, insert --Specification-- after "German Pat.".

Column 2, line 21, insert --suitable-- after "activity".

Column 5, line 29, "carried" should be --carrier--.

Column 8, line 5, "spltting" should be --splitting--.

Column 10, line 32, Example 8, insert --by-- between "5.8" and "means".

Column 11, line 35, Example 11, ".5" should be beside "86".

Column 12, line 14, Example 17, "penicillan" should be --penicillin--.

Signed and Sealed this sixth Day of April 1976

[SEAL]

Attest:

RUTH C. MASON  
*Attesting Officer*

C. MARSHALL DANN  
*Commissioner of Patents and Trademarks*